United States Patent [19]

Zagaja, III et al.

[11] Patent Number: 5,580,672
[45] Date of Patent: Dec. 3, 1996

[54] METHOD FOR REDUCING THE RISK OF PERFORATION OR GAS LEAKAGE IN ELECTROCHEMICAL AND GAS GENERATING DEVICES

[75] Inventors: John A. Zagaja, III, East Granby, Conn.; Anthony B. LaConti, Lynnfield, Mass.

[73] Assignee: United Technologies Corporation, Hartford, Conn.

[21] Appl. No.: 486,636

[22] Filed: Jun. 7, 1995

[51] Int. Cl.$^6$ .............................. H01M 8/02; C25B 9/00
[52] U.S. Cl. .......................... 429/13; 429/34; 204/290 F; 204/265
[58] Field of Search .................. 429/13, 16, 17, 429/34, 19, 35, 210, 38, 39; 204/194, 245, 246, 251, 252, 254, 295, 290 R, 290 G, 265, 266, 290 F

[56] References Cited

U.S. PATENT DOCUMENTS

| | | | |
|---|---|---|---|
| 3,617,462 | 11/1971 | DeWitt | 204/290 F |
| 3,878,084 | 4/1975 | Schultz et al. | 204/290 F |
| 3,884,792 | 5/1975 | McGilvery | 204/290 F |
| 3,919,059 | 11/1975 | Raetzsch et al. | 204/290 F |
| 3,992,279 | 11/1976 | Larsson | 204/290 F X |
| 4,137,145 | 1/1979 | Wallace | 204/290 R |
| 4,138,324 | 2/1979 | Meyer | 204/256 X |
| 4,332,662 | 6/1982 | Pouli et al. | 204/265 |
| 4,364,806 | 12/1982 | Rogers | 204/265 X |

*Primary Examiner*—Anthony Skapars
*Attorney, Agent, or Firm*—Mary R. Bonzagni, Esq.; Holland & Bonzagni, P.C.

[57] ABSTRACT

This invention relates to the discovery that during operation and/or shutdown of electrochemical and gas generating devices corrosive materials are released from hardware and components employed therein and that such materials are principally responsible for observed pitting and perforation failure of the metallic hardware, including the separator/collector sheets, of these devices that serve to partition and hermetically seal compartments that support a hydrogen atmosphere. This invention therefore particularly relates to a method for improving the reliability of such devices by reducing brittle failure and perforation failure of these separator sheets by providing a composite separator sheet made up of a layer of a material resistant to molecular hydrogen embrittlement adhered to a layer of a corrosion resistant material. This invention further particularly relates to an improved electrochemical or gas generating device that employs the above-described composite separator sheet such that the hydrogen embrittlement resistant layer of the composite sheet faces the compartment that supports the hydrogen atmosphere.

10 Claims, 1 Drawing Sheet

METHOD FOR REDUCING THE RISK OF PERFORATION OR GAS LEAKAGE IN ELECTROCHEMICAL AND GAS GENERATING DEVICES

FIELD OF THE INVENTION

The present invention relates to electrochemical devices, such as electrolysis cells and fuel cells, and to gas generating compressing and concentrating devices, that utilize metallic hardware. The present invention more particularly relates to a means for resisting anodic pitting corrosion of metallic hardware that occurs during long life operation of such cells or devices.

BACKGROUND OF THE INVENTION

Electrochemical cell devices are well known and are usually constructed to contain a multitude of individual electrochemical cells that are typically arranged in stacks. Such electrochemical cell devices typically employ metallic hardware and generally fall into one of two categories—namely, electrolysis cells, in which water or another liquid is electrolytically disassociated into its components, and fuel cells, in which a fuel (e.g., hydrogen, ammonia and hydrazine) and an oxidizer (e.g., air, oxygen) are catalytically combined, usually in order to generate electricity in the process.

As is well known, these two categories of electrochemical cell devices have many structural features in common. Therefore, in an effort to simplify the discussion hereinbelow, electrochemical cell devices, constructed and operated to perform the electrolysis of water, will be specifically described.

Such devices, which generate hydrogen and oxygen gas through the electrochemical reaction of water, at the surface of catalytic electrodes separated by an ion transporting membrane (e.g., SPE® water electrolyzers) have a structure of the type in which both sides of the ion exchange membrane are covered with electrode materials.

The metallic hardware employed in these devices, on the hydrogen side, typically include, a screen package, a fret plate(s) and a hydrogen separator sheet with the hydrogen separator sheet serving to divide the hydrogen side into a wet hydrogen section and an inerted compression compartment. All hardware components on the hydrogen side, including the hydrogen separator sheet, are typically fabricated from zirconium. Zirconium is an attractive material for use in a hydrogen atmosphere because it has superior resistance to hydrogen embrittlement. It has been found, however, that pitting of zirconium hydrogen separator sheets occurs during long life operation of these electrochemical devices.

The electrode material covering both sides of the ion exchange membrane, which are platinum group metals or oxides thereof, are typically prepared by thermal fusion of metal salts (e.g., PtCl) with sodium nitrate. The fusion step is followed by an aqueous phase electrochemical reduction at hydrogen potential in sulfuric acid and subsequent repeated water rinses to remove residual sulfur and chloride species. The resulting catalyst material is reasonably understood to be devoid or substantially devoid of any residual corrosive by-products.

The present invention is based upon the discovery that such electrode materials are not devoid or substantially devoid of residual corrosive by-products and that such by-products (e.g., chloride ions) are released from the electrode structure during cell operation. The present invention is also based upon the further discovery that such released corrosive by-products are principally responsible for the observed pitting corrosion of the zirconium hydrogen separator sheets and that such corrosion is aggravated by the presence of both fluoride ions, released as degradation products of the ion exchange membrane, and ferric ions, released from iron-based system components (e.g., plumbing).

In accordance with the above, it is an object of the present invention to provide a means for resisting pitting or corrosion of metallic hardware, such as hydrogen separator sheets, in electrochemical devices and gas generating devices, while maintaining the resistance of such metallic hardware to hydrogen embrittlement.

It is a further object to provide a means for reducing the risk of perforation or gas leakage and for further increasing the reliability of such devices.

SUMMARY OF THE INVENTION

The present invention therefore provides a method for improving the reliability of, by reducing the risk of perforation or gas leakage in, electrochemical and gas generating devices that utilize metallic hardware that is exposed, during operation and/or shutdown, to a hydrogen environment and to corrosive materials released from the hardware and/or components of such devices. The devices are made up of at least one cell having a compartment for containing water and hydrogen (i.e., wet hydrogen section) and an inerted compression compartment separated by a hydrogen separator/collector sheet. The present inventive method more particularly comprises providing a hydrogen separator/collector sheet made up of a layer of a material resistant to hydrogen embrittlement adhered to a layer of a corrosion resistant material where the layer resistant to hydrogen embrittlement faces the wet hydrogen section and where the layer resistant to corrosion faces the compression compartment of such electrochemical and gas generating devices.

The present invention also provides an improved electrochemical or gas generating device that employs the above-described hydrogen separator/collector sheet.

BRIEF DESCRIPTION OF THE DRAWINGS

The present invention will be described in more detail below with reference to the accompanying drawings in which.

DESCRIPTION OF THE PREFERRED EMBODIMENT

Although the present invention is described hereinbelow generally in association with water electrolyzers, the invention is not so limited. The inventive method can be utilized with electrolyzers, fuel cells and gas compressors that utilize metallic hardware that during operation and/or shutdown is exposed, at least partially, to both a hydrogen atmosphere and to corrosive materials released from hardware and/or components of such systems or devices.

The term corrosive, as used herein, is intended to mean materials that effect a gradual destruction or pitting of a metal or alloy due to chemical processes such as oxidation.

The term embrittlement is intended to mean a reduction or loss of ductility or toughness.

Figure 1:
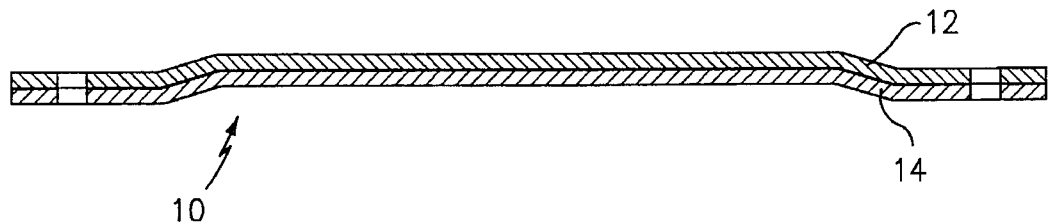
FIG. 1 is a cross-sectional view of the novel separator/collector sheet of the present invention.

Referring now to the drawings in detail, and first to FIG. 1 thereof, it may be seen that the reference number 10 has been used to identify the novel separator/collector sheet of the present invention. Separator/collector sheet 10 basically comprises a layer of a material resistant to hydrogen embrittlement 12 that is adhered to a layer of a corrosion or pitting resistant material 14.

Materials contemplated for use in the layer resistant to hydrogen embrittlement 12 include stainless alloys, zirconium and alloys thereof, with the preferred material being zirconium.

Materials contemplated for use in the layer resistant to corrosion or pitting 14 include niobium, gold and alloys of niobium, gold, cobalt and/or nickel. Preferred corrosion resistant materials include niobium and a nickel-based alloy sold by Haynes International, Inc. of Kokomo, Ind. under the trade designation HASTELLOY C-276.

Each layer 12, 14 of the separator/collector sheet 10 of the present invention preferably has a thickness ranging from about 0.05 mm to about 0.13 mm and more preferably has a thickness ranging from about 0.05 mm to about 0.08 mm.

The subject layers 12, 14 can be adhered to each other by any one of a number of techniques including conventional metal rolling techniques, that promote mechanical bonding, followed by metallurgical processes that promote metallurgical bonding. Other contemplated techniques include explosion bonding and plasma spraying. As is well known in the art, explosion bonding is a process generally used to join flat plates. In this process, the two materials to be joined are separated by an established standoff distance. One plate is then covered with a suitable explosive material. Detonation of the explosive material produces a progressive collision between the two materials at an angle that breaks up and expels the surface and produces an interface bond. As is also well known in the art, plasma spraying is a process by which a metallic material is heated and then propelled in atomized form onto a substrate. This material may be initially in the form of wire, rod or powder. It is heated to a molten state and propelled from a spray gun to the substrate by a gas jet.

In a preferred embodiment, the separator/collector sheet 10 of the present invention is a zirconium/niobium composite sheet prepared by first mechanically bonding the respective layers 12, 14 by employing conventional metal rolling techniques and then by metallurgically bonding the layers 12, 14 by heating the mechanically bonded assembly to a temperature of from about 900 to about 1000° C. for about 30 minutes to about 1 hour.

Figure 2:
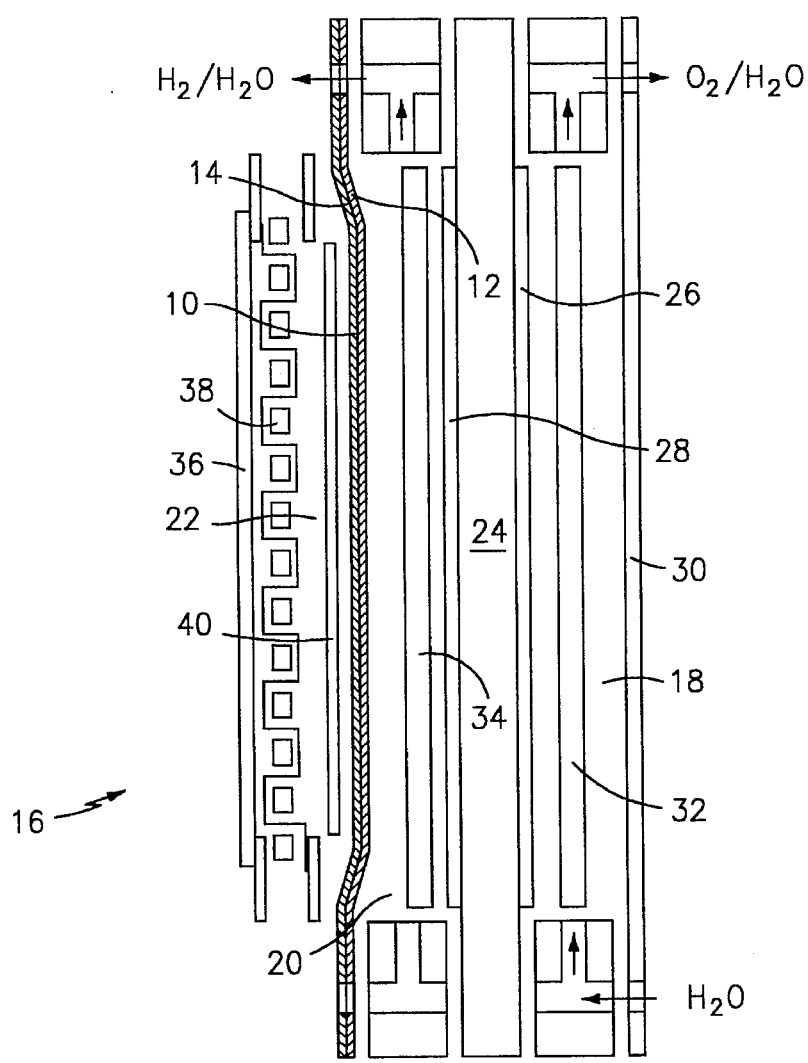
FIG. 2 is a schematic depiction of an ion exchange membrane water electrolyzer employing the separator/collector sheet of the present invention.

Referring now to FIG. 2, reference number 16 has been used to identify a representative cell of the improved electrochemical device of the present invention which, in FIG. 2, constitutes an ion exchange membrane water electrolyzer. Except for the use of the novel separator/collector sheet 10 according to the present invention, cell 16 may be of any known construction, and operates in accordance with known principles. Such cells 16 are usually compressed and arranged in a stack-like assembly and electrically connected in series.

Cell 16 basically comprises an anode chamber 18, a cathode chamber 20, and an inerted compression compartment 22, where the anode chamber 18 and the cathode chamber 20 are separated by an ion exchange membrane 24 having an anode electrode 26 and a cathode electrode 28 in intimate contact therewith and where the cathode chamber 20 and the inerted compression compartment 22 are separated by the separator/collector sheet 10. The anode chamber 18 is formed by anode electrode 26 and a second separator/collector sheet 30 and contains a first screen set 32 that is superimposed on the anode electrode 26 when cell 16 is compressed. The cathode chamber 20 is formed by cathode electrode 28 and the separator/collector sheet 10 and contains a second screen set 34 that is superimposed on the cathode electrode 28 when cell 16 is compressed. The inerted compression compartment 22 is formed by separator/collector sheet 10 and a third screen set 36, and contains woven pressure pad 38 and fret plate 40, all superimposed on the separator/collector sheet 10 when cell 16 is compressed.

In operation, water is introduced into the anode chamber 18 where it passes through the first screen set 32 to the anode electrode 26. At the anode electrode 26, the water is electrolyzed to oxygen gas and hydrogen ions. The hydrogen ions and some water migrate across the ion exchange membrane 24 to the cathode electrode 28 where the hydrogen ions form molecular hydrogen. The molecular hydrogen exits cell 16 through the second screen set 34 of the cathode chamber 20 while the oxygen gas, along with water, exits through the first screen set 32 of the anode chamber 18.

The use of separator/collector sheet 10 in cell 16, where the layer resistant to hydrogen embrittlement 12 faces cathode chamber 20 and where the layer resistant to corrosion or pitting 14 faces compression compartment 22, serves to reduce the risk of perforation or gas leakage and thereby further increases system reliability. In particular, the use of separator/collector sheet 10, as described, prevents molecular hydrogen from reaching layer 14 inducing embrittlement and prevents corrosive agents from reaching layer 12 causing pitting.

The present invention is described in more detail with reference to the following Examples which are for purposes of illustration only and are not to be understood as indicating or implying any limitations on the broad invention described herein.

WORKING EXAMPLES

1. Components Used. Zr foil—zirconium foil having a thickness of 0.13 millimeters (mm) obtained from Teledyne Wah Chang, located at P.O. Box 460-T, Albany, Oreg. 97321, under the product designation Zr foil per ASTM B551.

Nb foil—niobium foil having a thickness of 0.13 mm, obtained from Teledyne Wah Chang, located at P.O. Box 460T, Albany, Oreg. 97321, under the product designation Nb foil per ASTM B393.

Au foil—gold foil having a thickness of 0.13 mm, obtained from Handy & Harman, located at 300 Rye Street, South Windsor, Conn. 06074, under the product designation 0.999 pure gold foil.

Hastelloy foil—a nickel-based alloy foil having a thickness of 0.13 mm obtained from Haynes International, Inc., located at 1020 West Park Avenue, Kokomo, Ind. 46904-9013, under the product designation HASTELLOY C-276.

Zr collector—a zirconium separator/collector sheet measuring 23.5 centimeters (cm) in diameter.

Hastelloy collector—a nickel-based alloy separator/collector sheet prepared from HASTELLOY C-276 and measuring 23.5 cm in diameter.

2. Separator/Collector Sheet 10 Preparation.

One sheet of separator/collector sheet 10, made up of a layer of Zr foil and a layer of Nb foil was prepared by rolling the layer of Zr foil and the layer of Nb foil between two metal rollers so as to promote mechanical bonding and then by heating the mechanically bonded composite sheet to a temperature of 900 to 1000° C. for approximately 1 hour so as to promote metallurgical bonding.

3. Electrolysis Cell Assemblies.

a. Cell Assemblies A, B and C

Three identical ion exchange membrane water electrolysis cells, each having an active area of 213 cm$^2$, were assembled as set forth in FIG. 2 with the exceptions that: a Zr collector was employed instead of the separator/collector sheet 10 of the present invention; and a zirconium fret plate was positioned between the second screen set 34, which comprised three screens, and the Zr collector. The cathode hardware components of the cell assemblies A, B and C are described hereinbelow:

| CATHODE HARDWARE COMPONENTS | MATERIAL | DIMENSIONS |
|---|---|---|
| each screen of second screen set 34 | zirconium | 23.5 cm in diameter |
| zirconium fret plate | zirconium | 23.5 cm in diameter |
| fret plate 40 | niobium | 23.5 cm in diameter | b. Cell Assembly D

An ion exchange membrane water electrolysis cell, having an active area of 213 cm$^2$ was assembled as set forth in FIG. 2 with the exception that a Zr collector in intimate contact with a Au foil was employed instead of the composite separator/collector sheet 10 of the present invention and was positioned such that the Zr collector faced compression compartment 22 and the Au foil faced cathode chamber 20.

c. Cell Assembly E

An ion exchange membrane water electrolysis cell, having an active area of 213 cm$^2$ was assembled as set forth in FIG. 2 with the exception that a Zr collector in intimate contact with a Hastelloy foil was employed instead of the composite separator/collector sheet 10 of the present invention and was positioned such that the Zr collector faced compression compartment 22 and the Hastelloy foil faced cathode chamber 20.

d. Cell F

One 250 millimeter(ml) beaker having 100 ml. of 0.1 molar sulfuric acid was used as an electrolytic cell.

Test Methods.

a. Hydrogen Evolution Test—Three samples each of composite sheet 10, Zr foil and Nb foil, each measuring 2.54 cm$^2$, were used for this evaluation. Each sample was used as a hydrogen evolution (cathode) electrode in Cell F. For each evaluation, one sample was placed approximately 2.54 cm from a Dimensionally Stable Anode (DSA) screen in Cell F. Current was applied to the cell at a density of between 0.1 and 0.18 amperes per square centimeter (amps/cm$_2$). In evaluations involving composite Zr foil/Nb foil sheet 10, the Nb foil side was masked allowing hydrogen evolution from the Zr foil side only. Cell F, when employing Nb foil or Zr foil samples, was run at a current density of 0.1 amps/cm$^2$ for 8 hours and 65 hours, respectively. Cell F, when employing sheet 10 samples, was run at a current density of 0.18 amps/cm$^2$ for 322 hours.

The hydrogen content of samples was determined by vacuum hot extraction where a weighed sample was heated in a molybdenum crucible to 1200° to 1400° C. to release the hydrogen. The extracted hydrogen was then collected in a known volume and the pressure read by a McLeod gauge. The quantity of hydrogen was then calculated using the gas law formula PV=(W/M) RT, where W=weight of gas; M=molecular weight of gas; R=gas constant; T=degrees Kelvin; P=pressure calculated from the McLeod gauge; and V=collection volume.

b. Bond Strength—Three samples of separator/collector sheet 10 were placed in a Parr Pressure Reactor, Model A3039-71, containing sufficient water to cover the samples. The Paar-type bomb was sealed and the pressure increased to 10.2 to 10.9 MPa with nitrogen. During this period, the temperature was raised to 82° C. and the bomb left at this temperature and pressure for twenty-four hours. At the end of this period, the pressure was reduced to ambient pressure in an approximately one-minute time period. Each sample was then removed from the bomb and inspected for evidence of any separation of the novel separator/collector sheet 10.

c. Tensile Strength at yield (ASTM No. E345-81)- Tension Testing of Metallic Foils. Samples of the composite sheet 10, Zr foil and Nb foil were prepared per Type B of the ASTM. Wedge grips were used and the yield strength of the samples determined by the offset method.

d. Accelerated Halide Pitting Test—conducted on samples of separator/collector sheet 10, Zr foil and Nb foil, each measuring 0.13 mm. Testing was performed in a standard polarization cell in deaerated 0.01 molar hydrochloric acid. In order to induce chloride attack, samples were anodically polarized from 0 to 1.5 volts versus a saturated calomel electrode (S.C.E.) at a sweep rate of 10 millivolts per second. After exposure, the samples were examined for localizing pitting.

EXAMPLES 1 TO 3

In Examples 1 to 3, cell assemblies A, B and C were run at a current density of 1.08 amps/cm$^2$ for approximately 5300, 2300 and 10,000 hours, respectively, and the cathode hardware components analyzed for hydrogen content by vacuum hot extraction according to the method set forth hereinabove. The results are displayed below in Table I.

TABLE I

| | SUMMARY OF EXAMPLES 1 TO 3 | | |
|---|---|---|---|
| | HYDROGEN CONTENT (ppm) | | |
| CATHODE HARDWARE COMPONENTS | EXAMPLE 1 CELL ASSEMBLY A | EXAMPLE 2 CELL ASSEMBLY B | EXAMPLE 3 CELL ASSEMBLY C |
| first screen of second screen set 34 closest to cathode electrode 28 | 404 | 76 | 232 |
| remaining screens of second screen set 34 | 336 | 77 | 74 |
| zirconium fret plate | 49 | 47 | 72 |
| Zr collector | 30 | 31 | 21 |
| fret plate 40 | — | 5.6 | 7.0 |

Examples 1 to 3 demonstrate that there is minimal risk of hydrogen embrittlement for the separator/collector sheet 10 of the present invention where there was essentially no transfer of hydrogen from the Zr collector to the fret plate 40. As is evident from the results set forth in Table I, the hydrogen content decreases with increasing distance from the cathode electrode 28. The hydrogen content of the fret plate 40 was at or just above the 3 to 5 ppm background concentration. Although these test results were obtained for a Zr collector in intimate contact, but not bonded, to the fret plate 40, the results are indicative of the viability of the unitary or composite separator/collector sheet 10.

EXAMPLES 4 TO 5

In Examples 4 to 5, the feasibility of Zr foil/Au foil and Zr foil/Hastelloy foil separator/collector sheets 10 was determined.

Cell Assembly D was operated through twenty-seven stop/start cycles at a current density of 2.15 amps/cm$^2$, which served as an accelerated test for chloride induced pitting of the cathode hardware components. Subsequent disassembly of Cell Assembly D and examination of the Zr collector showed no pitting of the Zr collector.

Cell Assembly E was continuously operated at a current density of 1.08 amps/cm$^2$ for 250 hours. Subsequent disassembly of Cell Assembly E and examination of the Zr collector and the Hastelloy foil showed no signs of pitting on these components.

As is evident from the above, neither the Au foil or the Hastelloy foil, which were in intimate contact, but not adhered or bonded to the Zr collector, promoted pitting or hydrogen embrittlement of the Zr collector.

EXAMPLES 6 TO 12

In Examples 6 to 12, the bond strength and tensile properties of the separator/collector sheet 10 were tested.

In Examples 6 to 9, three samples of separator/collector sheet 10, were tested for bond strength according to the test method described hereinabove. Subsequent inspection of Examples 6 to 9 revealed that the integrity of the bond was excellent where no separation of sheet 10 was evident.

In Examples 10 to 12, samples of separator/collector sheet 10, Zr foil and Nb foil, respectively, were tested for tensile strength at yield according to the test method described hereinabove. Stress curves were developed for Examples 10 to 12 and yield points, determined as being the maximum load applied prior to observing ductile behavior, were calculated from the stress curves. The results are displayed below in Table II.

TABLE II

SUMMARY OF EXAMPLES 10 TO 12

| | | TENSILE PROPERTIES | |
| --- | --- | --- | --- |
| EXAMPLE | MA-TERIAL | MAXIMUM LOAD (KILOGRAMS) | YIELD POINT (MPa) |
| 10 | separator/collector sheet 10 | 33.6 | 512 |
| 11 | Zr foil | 23.6 | 382 |
| 12 | Nb foil | 11.8 | 218 |

The stress curves obtained for Examples 11 and 12 exhibited ductile characteristics. The ductility for Example 12 was more prominent where Example 12 yielded continuously with no evidence of a breaking point. Example 11 reached a point in its elongation where an audible snap was heard at fracture. The stress curve for Example 10 was similar to that of Example 11, elongating to a snapping point. Although the ductile behavior was reduced, the yield point of the inventive separator/collector sheet 10 of Example 10 was much greater than Examples 11 or 12.

EXAMPLES 13 TO 15 AND C1 TO C2

In Examples 13 to 15, three samples each of separator/collector sheet 10, Zr foil and Nb foil were tested according to the Hydrogen Evolution Test, described hereinabove. Subsequently, the hydrogen content of the exposed samples, along with two unexposed samples, was determined by vacuum hot extraction, as described hereinabove. The results are set forth in Table III below.

TABLE III

SUMMARY OF EXAMPLES 13 TO 15 AND C1 TO C2

| EXAMPLE | MATERIAL | HYDROGEN CONTENT (PPM)* |
| --- | --- | --- |
| 13 | exposed separator/collector sheet 10 Nb foil masked | |
| | Zr foil | 6060 |
| | Nb foil (322 hours at 170 amps/ft$^2$) | 77 |
| 14 | exposed Zr foil (65 hours at 100 amps/ft$^2$) | 532 |
| 15 | exposed Nb foil (8 hours at 100 amps/ft$^2$) | 5150 |
| C1 | unexposed Zr foil | 36 |
| C2 | unexposed Nb foil | 10 |

*average of three samples

As is evident from Table III, Example 15 embrittled quickly. In Example 13, which constitutes the separator/collector sheet 10 of the present invention, the Zr foil layer provided an excellent barrier to the diffusion of hydrogen. In particular, the Zr foil layer picked up close to 170 times its unexposed hydrogen content (see Example C1), while the Nb foil layer picked up only 8 times its unexposed hydrogen content (see Example C2).

EXAMPLES 16 TO 18

In Examples 16 to 18, samples of separator/collector sheet 10, Zr foil and Nb foil were tested according to the Accelerated Halide Pitting Test, described hereinabove. The samples were subsequently examined and it was found that the localized pitting characteristics of the Zr foil layer and of the Nb foil layer of sheet 10 were similar to the pitting characteristics of the Zr foil and the Nb foil. In particular, sheet 10 showed extensive localized pitting of the Zr foil layer extending through the entire thickness of the layer. However, there was no penetration of the pits/holes in the Nb foil layer of sheet 10.

Although this invention has been shown and described with respect to detailed embodiments thereof, it would be understood by those skilled in the art that various changes in form and detail thereof may be made without departing from the spirit and scope of the claimed invention.

We claim:

1. A method for improving the reliability of electrochemical and gas generating devices by reducing brittle failure and perforation failure of separator sheets employed therein, wherein said devices comprise at least one cell having a compartment for molecular hydrogen containment and a compression compartment, wherein said compartments are partitioned and hermetically sealed by a separator sheet, wherein said separator sheet is exposed, during operation and/or shutdown of said cell, to molecular hydrogen and to corrosive materials released from hardware and/or components of said cell, wherein said method comprises: providing a composite separator sheet comprising a layer of a material resistant to molecular hydrogen embrittlement adhered to a layer of a corrosion resistant material, wherein said layer of a material resistant to molecular hydrogen embrittlement faces said compartment for molecular hydrogen containment and wherein said layer of a corrosion resistant material faces said compression compartment.

2. The method of claim 1, wherein said material resistant to molecular hydrogen embrittlement is selected from the group consisting of stainless alloys, zirconium and zirconium alloys, and wherein said corrosion resistant material is selected from the group consisting of niobium, gold and alloys of niobium, gold, cobalt and/or nickel.

3. The method of claim 2, wherein said composite separator sheet is comprised of a layer of zirconium material and a layer of niobium material.

4. The method of claim 2, wherein said composite separator sheet is comprised of a layer of zirconium material and a layer of a nickel-based alloy material.

5. The composite separator sheet of the method of claim 1, wherein said layer of a material resistant to molecular hydrogen embrittlement is mechanically and metallurgically bonded to said layer of a corrosion resistant material.

6. An improved electrochemical or gas generating device comprising at least one cell having a compartment for molecular hydrogen containment and a compression compartment, wherein said compartments are partitioned and hermetically sealed by a separator sheet, wherein said separator sheet is exposed, during operation and/or shutdown of said cell, to molecular hydrogen and to corrosive materials released from hardware and/or components of said cell, wherein said improvement comprises: a composite separator sheet comprising a layer of a material resistant to molecular hydrogen embrittlement adhered to a layer of a corrosion resistant material, wherein said layer of a material resistant to molecular hydrogen embrittlement faces said compartment for molecular hydrogen containment and wherein said layer of a corrosion resistant material faces said compression compartment.

7. The improved electrochemical or gas generating device of claim 6, wherein said material resistant to molecular hydrogen embrittlement is selected from the group consisting of stainless alloys, zirconium and zirconium alloys, and wherein said corrosion resistant material is selected from the group consisting of niobium, gold and alloys of niobium, gold, cobalt and/or nickel.

8. The improved electrochemical or gas generating device of claim 7, wherein said composite separator sheet is comprised of a layer of zirconium material and a layer of niobium material.

9. The improved electrochemical or gas generating device of claim 7, wherein said composite separator sheet is comprised of a layer of zirconium material and a layer of a nickel-based alloy material.

10. The composite separator sheet of the improved electrochemical or gas generating device of claim 6, wherein said layer of a material resistant to molecular hydrogen embrittlement is mechanically and metallurgically bonded to said layer of a corrosion resistant material.

\* \* \* \* \*